(12) United States Patent
Kim et al.

(10) Patent No.: US 7,979,803 B2
(45) Date of Patent: Jul. 12, 2011

(54) RSS HOSTABLE CONTROL

(75) Inventors: Jane T. Kim, Seattle, WA (US); Amar S. Gandhi, Redmond, WA (US); Sean O. Lyndersay, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 112 days.

(21) Appl. No.: 11/276,584

(22) Filed: Mar. 6, 2006

(65) Prior Publication Data
US 2007/0245251 A1    Oct. 18, 2007

(51) Int. Cl.
*G06F 3/00* (2006.01)
(52) U.S. Cl. .................... 715/762; 715/764
(58) Field of Classification Search .......... 715/762, 715/764, 866
See application file for complete search history.

(56) References Cited

U.S. PATENT DOCUMENTS

| | | | |
|---|---|---|---|
| 5,404,488 A | 4/1995 | Kerrigan et al. |
| 5,649,186 A | 7/1997 | Ferguson |
| 5,819,034 A | 10/1998 | Joseph et al. |
| 5,819,284 A | 10/1998 | Farber et al. |
| 5,880,767 A | 3/1999 | Liu |
| 5,926,796 A | 7/1999 | Walker et al. |
| 5,960,411 A | 9/1999 | Hartman et al. |
| 5,974,549 A | 10/1999 | Golan |
| 6,035,336 A | 3/2000 | Lu et al. |
| 6,078,924 A | 6/2000 | Ainsbury et al. |
| 6,085,186 A | 7/2000 | Christianson et al. |
| 6,094,657 A | 7/2000 | Hailpern et al. |
| 6,282,546 B1 | 8/2001 | Gleichauf et al. |
| 6,366,912 B1 | 4/2002 | Wallent et al. |
| 6,411,331 B1 | 6/2002 | Sansom-Wai et al. |
| 6,434,745 B1 | 8/2002 | Conley, Jr. et al. |
| 6,544,295 B1 | 4/2003 | Bodnar |
| 6,594,692 B1 | 7/2003 | Reisman |
| 6,694,431 B1 | 2/2004 | Binding et al. |
| 6,708,172 B1 | 3/2004 | Wong et al. |
| 6,732,102 B1 | 5/2004 | Khandekar et al. |
| 6,766,458 B1 | 7/2004 | Harris et al. |
| 6,775,772 B1 | 8/2004 | Binding et al. |
| 6,874,084 B1 | 3/2005 | Dobner et al. |
| 7,092,992 B1 | 8/2006 | Yu |
| 7,143,084 B1 | 11/2006 | Rinearson et al. |
| 7,257,564 B2 | 8/2007 | Loughmiller et al. |
| 7,516,399 B2 | 4/2009 | Hsu et al. |
| 7,739,602 B2 | 6/2010 | Feng et al. |

(Continued)

FOREIGN PATENT DOCUMENTS

CA    2496672    8/2003

(Continued)

OTHER PUBLICATIONS

Burning Questions. "Feed Splicing, Part 1". Jul. 14, 2004. Available at http://blogs.feedburner.com/feedburner/archives/2004/07/feed_splicing_part_i.php.*

(Continued)

*Primary Examiner* — Boris Pesin
*Assistant Examiner* — Omar Abdul-Ali

(57) ABSTRACT

The embodiments described above utilize and leverage RSS to enable a user to interact more easily with different types of data, or data from different sources that are available over the web. In accordance with at least some embodiments, a hostable and/or customizable control is provided and gives the user the ability to interact with RSS feeds to store and further manipulate collections of items from different RSS feeds.

16 Claims, 4 Drawing Sheets

U.S. PATENT DOCUMENTS

| | | |
|---|---|---|
| 2001/0027472 A1 | 10/2001 | Guan |
| 2001/0050658 A1 | 12/2001 | Adams |
| 2001/0051907 A1 | 12/2001 | Kumar et al. |
| 2001/0056460 A1 | 12/2001 | Sahota et al. |
| 2002/0002571 A1 | 1/2002 | Manohar et al. |
| 2002/0019812 A1 | 2/2002 | Board et al. |
| 2002/0026462 A1 | 2/2002 | Shotton et al. |
| 2002/0035617 A1 | 3/2002 | Lynch et al. |
| 2002/0072951 A1 | 6/2002 | Lee et al. |
| 2002/0108115 A1 | 8/2002 | Palmer |
| 2002/0116630 A1 | 8/2002 | Stehlin |
| 2002/0124172 A1 | 9/2002 | Manahan |
| 2002/0147746 A1 | 10/2002 | Lee |
| 2002/0156905 A1 | 10/2002 | Weissman |
| 2002/0174201 A1 | 11/2002 | Ramer et al. |
| 2002/0184491 A1 | 12/2002 | Morgan et al. |
| 2002/0194151 A1 | 12/2002 | Fenton et al. |
| 2003/0014406 A1 | 1/2003 | Faieta et al. |
| 2003/0028762 A1 | 2/2003 | Trilli et al. |
| 2003/0033179 A1 | 2/2003 | Katz et al. |
| 2003/0033606 A1 | 2/2003 | Puente et al. |
| 2003/0117511 A1 | 6/2003 | Belz et al. |
| 2003/0120671 A1 | 6/2003 | Kim et al. |
| 2003/0135504 A1 | 7/2003 | Elvanoglu et al. |
| 2003/0135553 A1 | 7/2003 | Pendakur |
| 2003/0149737 A1 | 8/2003 | Lambert et al. |
| 2003/0167402 A1 | 9/2003 | Stolfo et al. |
| 2003/0229716 A1 | 12/2003 | Holland |
| 2004/0003097 A1 | 1/2004 | Willis et al. |
| 2004/0024720 A1 | 2/2004 | Fairweather |
| 2004/0031052 A1 | 2/2004 | Wannamaker et al. |
| 2004/0046885 A1 | 3/2004 | Regan et al. |
| 2004/0073924 A1 | 4/2004 | Pendakur |
| 2004/0093296 A1 | 5/2004 | Phelan et al. |
| 2004/0093563 A1 | 5/2004 | Pasquali |
| 2004/0117439 A1 | 6/2004 | Levett et al. |
| 2004/0143683 A1 | 7/2004 | Greenwood |
| 2004/0181753 A1 | 9/2004 | Michaelides |
| 2004/0225749 A1 | 11/2004 | Pavlik et al. |
| 2004/0230676 A1 | 11/2004 | Spivack et al. |
| 2004/0237120 A1 | 11/2004 | Lewin et al. |
| 2004/0250115 A1 | 12/2004 | Gemmel et al. |
| 2005/0010595 A1 | 1/2005 | Brown et al. |
| 2005/0015452 A1 | 1/2005 | Corson |
| 2005/0027676 A1 | 2/2005 | Eichstaedt |
| 2005/0033657 A1 | 2/2005 | Herrington et al. |
| 2005/0038717 A1 | 2/2005 | McQueen, III et al. |
| 2005/0039144 A1 | 2/2005 | Wada et al. |
| 2005/0050460 A1 | 3/2005 | Bedingfield, Sr. |
| 2005/0065906 A1 | 3/2005 | Romero |
| 2005/0097180 A1 | 5/2005 | Abdelhak |
| 2005/0108227 A1 | 5/2005 | Russell-Falla et al. |
| 2005/0108262 A1 | 5/2005 | Fawcett, Jr. et al. |
| 2005/0108633 A1 | 5/2005 | Sahota et al. |
| 2005/0119910 A1 | 6/2005 | Schneider |
| 2005/0119913 A1 | 6/2005 | Hornreich et al. |
| 2005/0165615 A1 | 7/2005 | Minar |
| 2005/0171836 A1 | 8/2005 | Leacy |
| 2005/0182645 A1 | 8/2005 | Ehlis et al. |
| 2005/0216439 A1* | 9/2005 | Kawakita ........................ 707/1 |
| 2005/0216452 A1 | 9/2005 | Teague |
| 2005/0216837 A1 | 9/2005 | Washburn |
| 2005/0228887 A1 | 10/2005 | Wang |
| 2005/0256768 A1 | 11/2005 | Robinson |
| 2005/0268100 A1 | 12/2005 | Gasparini et al. |
| 2005/0289147 A1 | 12/2005 | Kahn et al. |
| 2005/0289468 A1 | 12/2005 | Kahn et al. |
| 2006/0004703 A1 | 1/2006 | Spivack et al. |
| 2006/0053293 A1 | 3/2006 | Zager et al. |
| 2006/0095507 A1 | 5/2006 | Watson |
| 2006/0095860 A1 | 5/2006 | Wada et al. |
| 2006/0129917 A1 | 6/2006 | Volk et al. |
| 2006/0161845 A1 | 7/2006 | Kahn et al. |
| 2006/0173985 A1 | 8/2006 | Moore |
| 2006/0184617 A1 | 8/2006 | Nicholas et al. |
| 2006/0200443 A1 | 9/2006 | Kahn et al. |
| 2006/0200740 A1 | 9/2006 | Kahn et al. |
| 2006/0206803 A1 | 9/2006 | Smith |
| 2006/0218403 A1 | 9/2006 | Sauve et al. |
| 2006/0230021 A1 | 10/2006 | Diab et al. |
| 2006/0242663 A1 | 10/2006 | Gogerty |
| 2006/0253459 A1 | 11/2006 | Kahn et al. |
| 2006/0253489 A1 | 11/2006 | Kahn et al. |
| 2006/0265518 A1 | 11/2006 | Owens et al. |
| 2006/0288011 A1 | 12/2006 | Gandhi et al. |
| 2006/0288329 A1 | 12/2006 | Gandhi |
| 2007/0011156 A1 | 1/2007 | Maron |
| 2007/0011665 A1 | 1/2007 | Gandhi et al. |
| 2007/0050446 A1 | 3/2007 | Moore |
| 2007/0061711 A1* | 3/2007 | Bodin et al. ................... 715/523 |
| 2007/0094389 A1* | 4/2007 | Nussey et al. ................ 709/225 |
| 2007/0100836 A1* | 5/2007 | Eichstaedt et al. ............. 707/10 |
| 2007/0100959 A1* | 5/2007 | Eichstaedt et al. ........... 709/217 |
| 2007/0101313 A1* | 5/2007 | Bodin et al. ................... 717/114 |
| 2007/0130518 A1* | 6/2007 | Shavit et al. .................. 715/530 |
| 2007/0208759 A1 | 9/2007 | von Koch |
| 2007/0282973 A1* | 12/2007 | Chapman et al. ............. 709/217 |
| 2008/0195483 A1 | 8/2008 | Moora |
| 2009/0013266 A1 | 1/2009 | Gandhi |
| 2009/0019063 A1 | 1/2009 | Gandhi |

FOREIGN PATENT DOCUMENTS

| | | |
|---|---|---|
| CN | 1536483 | 10/2004 |
| EP | 1997023 | 12/2008 |
| JP | 2008547117 | 12/2008 |
| WO | WO-01/26018 | 4/2001 |
| WO | WO0207013 A2 | 1/2002 |
| WO | WO2004107216 | 5/2004 |
| WO | WO2005027402 | 3/2005 |
| WO | W02005089336 | 9/2005 |
| WO | WO-2005/089336 | 9/2005 |
| WO | W02005098675 | 10/2005 |

OTHER PUBLICATIONS http://www.feedburner.com.*

Introduction to RSS. Available at: http://www.webreference.com/authoring/languages/xml/rss/intro.*

Burning Questions. "Feed Splicing, Part 2". Aug. 16, 2004. Available at http://blogs.feedburner.com/feedburner/archives/2004/08feed_splicing_part_ii.php.*

The Feed Thickens. http://blog.flicker.net/en/2007/14/the-feed-thickens.*

Benzinger, Brian. "Google Reader Reviewed". Oct. 7, 2005. Available at: http://www.solutionwatch.com/250/google-reader-reviewed.*

Google Reader: beta feed reader, available Oct. 7, 2005. Available at: http://www.consumingexperience.com/2005/10/google-reader-beta-feed-reader.html.*

Google Reader: Reviewer's Guide. http://web.archive.org/web/20051016030355/http://www.google.com/press/guides/reader_overview.pdf. Oct. 16, 2005.*

Verisign Inc., "Licensing verisign certificates: securing multiple web server and domain configurations", www.msctrustgate.com/pdf/licensing.pdf, white paper,(2001).

Herzberg, Amir et al., "Protecting valve web users, or preventing spoofing and establishing credential sites", www.cs.bu.ac.il/~herzea/papers/ecommerce/trusted_credentials_area.pdf, Bar Ilan University,(Jul. 2004).

Ncipher Inc., "Protecting commercial secure web servers from key-finding treats", www.ncipher.com/uploads/resources/pcws.pdf, white paper,(1999).

"Six Apart: Developer Documentation : Trackback Technical Specificaton", Printed on Feb. 15, 2008, website: http://www.sixapart.com/pronet/docs/trackback_spec, 5 pages.

"RSS 2.0 Specification", (Jul. 15, 2003),1-8.

Hammersley, Ben "Developing Feeds with RSS and Atom", *O'Reilly books*, O'Reilly Media, Inc.,(Apr. 2005),1-10.

Blair, Eric "Review: Netnewswire 2.0", *ATPM 11.06*, (Jun. 2005),1-12.

"Attensa Outlook—Getting Started", www.attensa.com, (2005),1-33.

Hammersley, Ben "Content Syndication with RSS", *O'Reilly books*, O'Reilly & Associates,(Mar. 2003),1-19.

Ayers, Danny et al., "Beginning RSS and Atom Programming", Wiley Publishing, Inc.,(2005),1-54.

Huier, Zhang et al., "Design and Implementation of RSS-based Science and Technology Information Syndication System", *Library of Chinese Academy of Sciences*, 1-15.

"flaggeditems.png", *Print screen from Internet Search*, Retrieved from <http://web.archive.org/web/20050623095655/http://ranchero.com/images/nnw2/flaggeditems.png> on Nov. 13, 2008,1 page.

"Ranchero Software: What's New in NetNewsWire 2.0", *Web article*, retrieved from <http://web.archive.org/web/20050618014501/http://ranchero.com/netnewswire/whatsnew/netnewswire20.php> on Nov. 13, 2008,pp. 1-3.

"syncing.png", *Print Screen from article*, retrieved from <http://web.archive.org/web/20050623095327/http://ranchero.com/images/nnw2/syncing.png> on Nov. 13, 2008,1 page.

"Ranchero Software Search Engine Subscriptions", *On-line Article*, Retrieved from <http://web.archive.org/web/20050714082710/http://ranchero.com/netnewswire/features/searchEngineSubscriptions.php> on Nov. 13, 2008,pp. 1-2.

"SearchFeed.png", *Print Screen in article*, Retrieved from <http://web.archive.org/web/20050623095831/http://ranchero.com/images/nnw2/searchFeed.png> on Nov. 13, 2008,1 page.

"Searching.png", *Print Screen from article*, Retrieved from <http://web.archive.org/web/20050623095422/http://ranchero.com/images/nnw2/searching.png> on Nov. 13, 2008,1 page.

"Ranchero Software _ Smart Lists", *Internet Article*, Retrieved from <http://web.archive.org/web/20050602084724/http://ranchero.com/netnewswire/features/smartLists.php> on Nov. 13, 2008,pp. 1-2.

"smartList.png", *Print Screen from Internet Article*, Retrieved from <http://web.archive.org/web/20050623095628/http://ranchero.com/images/nnw2/smartList.png> on Nov. 13, 2008,1 page.

"Ranchero Software_Flagged Items", *Internet Article*, Retrieved from <http://web.archive.org/web/20050612083011/http://ranchero.com/netnewswire/features/flaggedItems.php> on Nov. 13, 2008,1 page.

"Rancho Software_Features Chart", *Internet Article*, Retrieved from <http://web.archive.org/web/20050609010027/http://ranchero.com/netnewswire/featureschart20.php> on Nov. 13, 2008,pp. 1-3.

"Persistence.png", *Print Screen from Internet Article*, Retrieved from <http://web.archive.org/web/20050623095937/http://ranchero.com/images/nnw2/persistence.png> on Nov. 13, 2008,1 page.

"Ranchero Software _ Subscription Sharing", *Internet Article*, Retrieved from <http://web.archive.org/web/20050811083741/http://ranchero.com/netnewswire/features/sharing.php> on Nov. 13, 2008,pp. 1-3.

"mainWindow2.png", *Print Screen from Internet Article*, Retrieved from <http://web.archive.org/web/20050623095300/http://ranchero.com/images/nnw2/mainWindow2.png> on Nov. 13, 2008,1 page.

"Ranchero Software _ NetNewsWire", *Internet Article*, Retrieved from <http://web.archive.org/web/20051003204517/ranchero.com/netnewswire/> on Nov. 13, 2008,pp. 1-5.

"Search Engine Subscriptions", *Internet Article*, Retrieved from <http://web.archive.org/web/20051217013212/http://ranchero.com/netnewswire/helpBook/searchEngineSubs.html> on Nov. 13, 2008,1 page.

"Syncing", *Internet Article*, Retrieved from <http://web.archive.org/web/20051217023557/http://ranchero.com/netnewswire/helpBook/syncing.html> on Nov. 13, 2008,pp. 1-2.

"Subscribing and Unsubscribing", *Internet Article*, Retrieved from <http://web.archive.org/web/20060915152527/http://ranchero.com/netnewswire/helpBook/subUnsub.html> on Nov. 13, 2008,pp. 1-2.

"Ranchero Software _ NetNewsWire 2.0 Change Notes", *Internet Article*, Retrieved from <http://web.archive.org/web/20051024203943/http://ranchero.com/netnewswire/changenotes/netnewswire20.php> on Nov. 13, 2008,pp. 1-3.

"Yahoo! Search Services and Tools", *Internet Search Screen*, Retrieved from <http://web.archive.org/web/20051001065344/http://search.yahoo.com/mrss/submit> on Nov. 13, 2008,1 page.

"Yahoo! Publisher's Guide to RSS : Submit your RSS Feed", *Internet Article*, Retrieved from <http://web.archive.org/web/20051216153612/http://uk.promotions.yahoo.com/publisher/submit.html> on Nov. 13, 2008,pp. 1-3.

"Blogdigger—Add Feed Form", *Internet Resource*, Retrieved from <http://web.archive.org/web/20050618015745/http://www.blogdigger.com/add.jsp> on Nov. 13, 2008 1 of> on Nov. 13, 2008,1 page.

"RSS Submissions", *Internet Article*, Retrieved from <http://web.archive.org/web/20050619014308/http://www.rss-specifications.com/rss-submission.htm> on Nov. 13, 2008,pp. 1-3.

"Ranchero Software _ Editing LiveJournal Logs", *Internet Article*, Retrieved from <http://web.archive.org/web/20051217022724/http://ranchero.com/netnewswire/tips/livejournalconfig.php> on Nov. 13, 2008,pp. 1-3.

"Ranchero Software _ NetNewsWfaq", *Internet Search Engine FAQ sheet*, Retrieved from <http://web.archive.org/web/20030201120948/http://ranchero.com/netnewswire/faq.php> on Nov. 13, 2008,pp. 1-4.

"NetNewsWire_helpbook_faq", *Internet Search FAQ sheet*, Retrieved from <http://web.archive.org/web/20050623234918/http://ranchero.com/netnewswire/helpBook/faq.html> on Nov. 13, 2008,pp. 1-3.

"Syndic8.com—Documents1", *Internet Article*, Retrieved from <http://web.archive.org/web/20050513214756/http://www.syndic8.com/documents/howto/> on Nov. 13, 2008,pp. 1-3.

"Syndic8.com—Documents2", *Internet Article*, Retrieved from <http://web.archive.org/web/20050622035505/http://www.syndic8.com/documents/howto/> on Nov. 13, 2008,pp. 1-3.

"Syndic8.com—HowToUse", *Internet Article*, Retrieved from <http://web.archive.org/web/20050619233841/http://www.syndic8.com/howto.php> on Nov. 13, 2008,pp. 1-4.

"Kalsey_Blogfeed", *Internet Article*, Retrieved from <http://web.archive.org/web/20050515005125/http://www.kalsey.com/tools/blogfeed/> on Nov. 13, 2008,pp. 1-3.

"Non Final Office Action", U.S. Appl. No. 11/276,536, (Jan. 9, 2009),35 pages.

"Final Office Action", U.S. Appl. No. 11/158,398, (Feb. 5, 2009),21 pages.

"Foreign Office Action", Application Serial No. 200680018421.0, (Jan. 9, 2009),10 pages.

"Non Final Office Action", U.S. Appl. No. 11/276,536, (May 28, 2009),18 pages.

"Final Office Action", U.S. Appl. No. 11/158,936, (Jun. 26, 2009),27 pages.

"Non Final Office Action", U.S. Appl. No. 11/158,911, (Jun. 30, 2009),16 pages.

"EP Search Report", U.S. Appl. No. 07751586.4, (Aug. 13, 2009),9 pages.

Attardi, G et al., "The LOA Customizable Media Aggregator", *Automated Production of Cross Media Content for Multi-Channel Distribution*, 2005. Axmedis 2005. First International Conference on Florence, Italy 30-02 Nov. 2005, Piscataway, NJ, USA, IEEE, Nov. 30, 2005. XP010892440 ISBN: 978-0-7695-2348-4, pp. 115-122.

"Non-Final Office Action", U.S. Appl. No. 11/158,398, (Sep. 8, 2009),9 pages.

Anonymous, "The Evolution of RSS", (Online); XP002546010; Internet; Retrieved from the Internet: URL:http://web.archive.org/web/20041011055544/http://www.webreference.com/authoring/languages/xml/rss/1/7.html *the whole document*,(Oct. 11, 2004),1 page.

"EP Search Report", Application Serial No. 07750552.7, EESR,(Sep. 30, 2009),6 pages.

"JP Notice of Publication", Application Serial No. 2008-558275, (Aug. 6, 2009),2 page.

"JP Notice of Publication", Application Serial No. 2008-558294, (Aug. 13, 2009),2 page.

"Non-Final Office Action", U.S. Appl. No. 11/276,536, (Oct. 7, 2009),15 pages.

"Final Office Action", U.S. Appl. No. 11/158,911, (Oct. 28, 2009),10 pages.

"Final Office Action", U.S. Appl. No. 11/276,536, (Apr. 23, 2010), 20 pages.

"PCT Search Report and Written Opinion", Application No. PCT/US06/23336, (Oct. 29, 2007), 8 pages.

"First Office Action", Chinese Application No. 200780007512.9, (Jan. 15, 2010), 7 pages.
"First Office Action", Chinese Application No. 200780008302.1, (Jan. 8, 2010), 15 pages.
"Non-Final Office Action", U.S. Appl. No. 11/158,936, (Jan. 12, 2010), 12 pages.
"Final Office Action", U.S. Appl. No. 11/158,398, (Mar. 22, 2010), 11 pages.
"Foreign Office Action", Application Serial No. 07750552.7, (Nov. 17, 2009), 6 pages.
"Final Office Action", U.S. Appl. No. 11/158,936, (Jul. 19, 2010), 14 pages.
"Foreign Office Action", Chinese Application No. 200680018421.0, (Jun. 24, 2010), 11 pages.
"Foreign Office Action", Chinese Application No. 200680018421.0, (Sep. 3, 2010), 9 pages.
"Foreign Office Action", Chinese Application No. 200680021415.0, (Jun. 8, 2010), 10 pages.
"Non-Final Office Action", U.S. Appl. No. 11/158,398, (May 13, 2010), 10 pages.
"Non-Final Office Action", U.S. Appl. No. 11/158,911, (Jun. 10, 2010), 11 pages.
"Non-Final Office Action", U.S. Appl. No. 11/276,536, (Sep. 15, 2010), 13 pages.
"Non-Final Office Action", U.S. Appl. No. 12/234,449, (Jun. 1, 2010), 8 pages.
Gill, Kathy E., "Blogging, RSS and the Information Landscape: A Look at Online News", *In Proceedings of WWW 2005*, (2005), 7 pages.
ATPM, Tetrault, "Review: Anonymizer Ultimate Security Suite", website at http://www.atpm.com/8/.09/anonymizer.shtml, Sep. 2002, 12 pages, printed Jul. 7, 2005.
"Welcome to Feed on Feeds, your server side personal RSS(and Atom!) aggregator", printed on Jun. 21, 2005 from website: http://feedonfeeds.com/, 4 pages.
"What is Reptile?", printed on Jun. 21, 2005 from website: http://reptile.openprivacy.org/overview.html, 2001, 4 pages.
Mozilla, "Why Use Firefox", website at http://www.mozilla.org/products/firefox, Jun. 17, 2005, 3 pages, printed Jul. 7, 2005.
"About Syndication, RSS, and Other Web-Altering Chemicals", FeedBurner, printed on Jun. 21, 2005 from website: http://www.feedburner.com/fb/a/aboutrss;jsessionid=96C24011924801F8B3CAF4F12B66B75D.app2, 2 pages.
Microsoft, Andersen, et al., "Changes to Functionality in Microsoft Windows XP Service Pack 2", website at http://www.microsoft.com/technet/prodtechnol/ winxppro/maintain /sp2brows.mspx, Aug. 9, 2004, 58 pages, printed Jul. 7, 2005.
"Dreams of a Rarebit Fiend", printed on Jun. 21, 2005 from website: http://www.johnmunsch.com/projects/HotSheet/, 6 pages.
"Google Search Appliance Feeds Protocol Developer's Guide", Google Inc., Jun. 2, 2005, printed from website: http://code.google.com/gsa_apis/feedsguide.html, 11 pages.
Microsoft. "Increase Your Browsing and E-Mail Safety" website at http://www.microsoft.com/security/incident/settings.mspx, Oct. 3, 2003, 4 pages, pritned Jul. 7, 2005.
"iSpeak It Web Feeds and Podcasts", ZappTek, 2002, printed from website: http://www.zapptek.com/ispeak-it/webpage.html, 3 pages.
"Latest Headline Viewer news and information", Version: 0.9.9, Mar. 2, 2005, printed from website: http://www.headlineviewer.com/news/index.shtml, 3 pages.
"Mac OS X Server", Apple Computer Inc., 2005, printed from website: http://www.apple.com/server/macosx/features/collaborationservices.html., 3 pages.
"MX RSS Reader-Writer: Use RSS feeds in your sites", InterAKT, printed Jun. 21, 2005 from website: http://www.interaktonline.com/Products/Dreamweaver-Extensions/MXRSSReader-Writer/Overview/?from=gg_rss, 2 pages.
"Project: RSS Viewer: Summary", SourceForge, 2005, printed from website: http://sourceforge.net/projects/rssview/, 3 pages.
"Safari RSS: Your Desktop is the new doorstep", Apple Computer Inc., 2005, printed from website: http://www.apple.com/macosx/features/safari/, 3 pages.
Acrobat Tracker 7.0.5 Available at http://partners.adobe.com/public/developer/en/acrobat/sdk/pdf/javascript/Tracker.pdf, Jul. 27, 2005, pp. 1-48.
Galbraith et al., "RssPing," available on the Internet at http://rssping.com.
I/ON User Guide Availabel at http://openvision.tv/home/viewer/tutorial, pp. 1-7.
"Final Office Action", U.S. Appl. No. 11/158,398, (Oct. 15, 2010), 11 pages.
"Final Office Action", U.S. Appl. No. 11/158,911, (Oct. 15, 2010), 13 pages.
"Foreign Office Action", Australian Application No. 2006262540, (Oct. 8, 2010), 1 page.
"Foreign Office Action", Chinese Application No. 200780008302.1, (Dec. 16, 2010), 12 pages.
"Non-Final Office Action", U.S. Appl. No. 12/234,449, (Oct. 27, 2010), 8 pages.
"Notice of Acceptance", Australian Application No. 2006262540, (Dec. 22, 2010), 2 pages.
"Advisory Action", U.S. Appl. No. 11/158,398, (Jan. 26, 2011), 3 pages.
"Final Office Action", U.S. Appl. No. 11/276,536, (Mar. 4, 2011), 17 pages.
"Final Office Action", U.S. Appl. No. 12/234,449, (Mar. 25, 2011), 11 pages.
"Foreign Office Action", Chinese Application No. 200680021415.0, (Mar. 14, 2011), 10 pages.
"Non-Final Office Action", U.S. Appl. No. 12/234,403, (Apr. 1, 2011), 10 pages.

\* cited by examiner

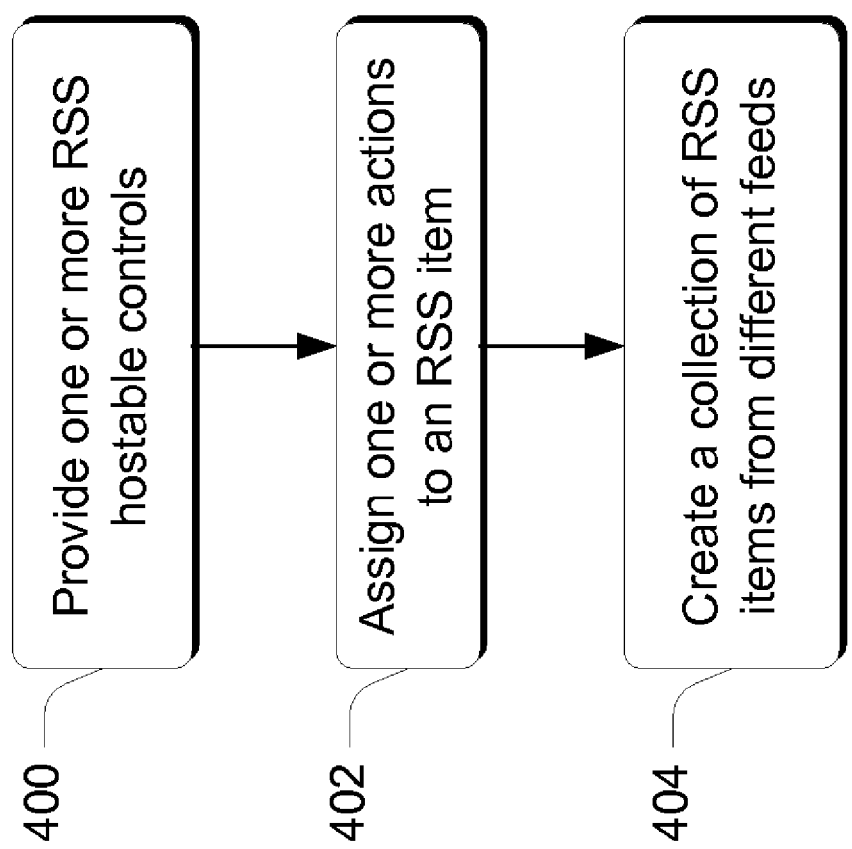

RSS HOSTABLE CONTROL

RELATED APPLICATION

This application is related to U.S. patent application Ser. No. 11/158,398.

BACKGROUND

Today, the web has many different types of content with which a user may interact. That is, web sites offer up a seemingly endless array of different types of content, such as documents, pictures, products, new items, blogs and the like. Many times, a user looking to interact with such content must do so in different ways which reflect the inconsistent behavior associated with these items. For example, a user who wishes to copy a photo from a web site typically has to right-click on the photo and select the "save" option. Doing so, however, typically loses the metadata associated with the photo. If a user is browsing a web site that sells books and wishes to save information about the book, the user must typically select the text that they wish to save and copy it to a document. Likewise, if a user is working with a document on Sharepoint and they wish to save it, they must typically press on the document to interact with the "download now" prompt.

The above constitutes but a few examples of the inconsistencies that a user encounters when attempting to interact with different types of web-available content.

SUMMARY

The embodiments described below utilize and leverage a web content syndication format known as Really Simple Syndication or RSS, to enable a user to interact more easily with different types of data, or data from different sources that are available over the web. In accordance with at least some embodiments, a hostable and/or customizable control is provided and gives the user the ability to interact with RSS feeds to store and further manipulate collections of items from different RSS feeds.

BRIEF DESCRIPTION OF THE DRAWINGS

FIG. 4 is a flow diagram that describes steps in a method in accordance with one embodiment.

DETAILED DESCRIPTION

Overview

The embodiments described below utilize and leverage a web content syndication format known as Really Simple Syndication or RSS, to enable a user to interact more easily with different types of data, or data from different sources that are available over the web. In accordance with at least some embodiments, a hostable and/or customizable control is provided and gives the user the ability to interact with RSS feeds to store and further manipulate collections of items from different RSS feeds and treat the collections like files on a local file system.

RSS web feeds can come in several different file formats, with the popular ones being RSS 0.91, 0.92, 1.0, 2.0 and Atom. RSS web feeds have become more and more popular on the web and numerous software applications with RSS support are being developed. The description below assumes some familiarity on the part of the reader with RSS. For additional background on RSS, there are a number of publicly available specifications that provide information that may be of interest to the reader. However, to provide some basic background on RSS, the following discussion is provided.

RSS is a dialect of XML. All RSS files must conform to the XML 1.0 specification, as published on the World Wide Web Consortium (W3C) website. At the top level, an RSS document includes an <rss> element, with a mandatory attribute called "version", that specifies the version of RSS that the document conforms to. Subordinate to the <rss> element is a single <channel> element, which contains information about the channel (metadata) and its contents.

According to the RSS 2.0 specification, there are three required channel elements: <title>, <link> and <description>. The title constitutes the name of the channel, the link describes the URL to the HTML website corresponding to the channel, and the description is a phrase or sentence describing the channel.

A channel may contain any number of <item>s. An item may represent a "story"—much like a story in a newspaper or magazine or some other piece of content. An item can typically also contain a title, link and description. All elements of an item are optional, however at least one of title or description must be present. There are a number of other elements that can be contained by the item element. According to the RSS 2.0 specification, these include author, category, comments, enclosure, guid, pubDate and source. These elements are also extendible and can be customized by publishers.

In this document, certain terminology will be used in the context of the RSS embodiment that is described. An item is a basic unit of a feed. Typically, an item represents a blog entry or a news article/abstract with a link to the actual article on the website, as noted above. A feed is a list of items in a resource.

Exemplary RSS Hostable Control

Figure 1:
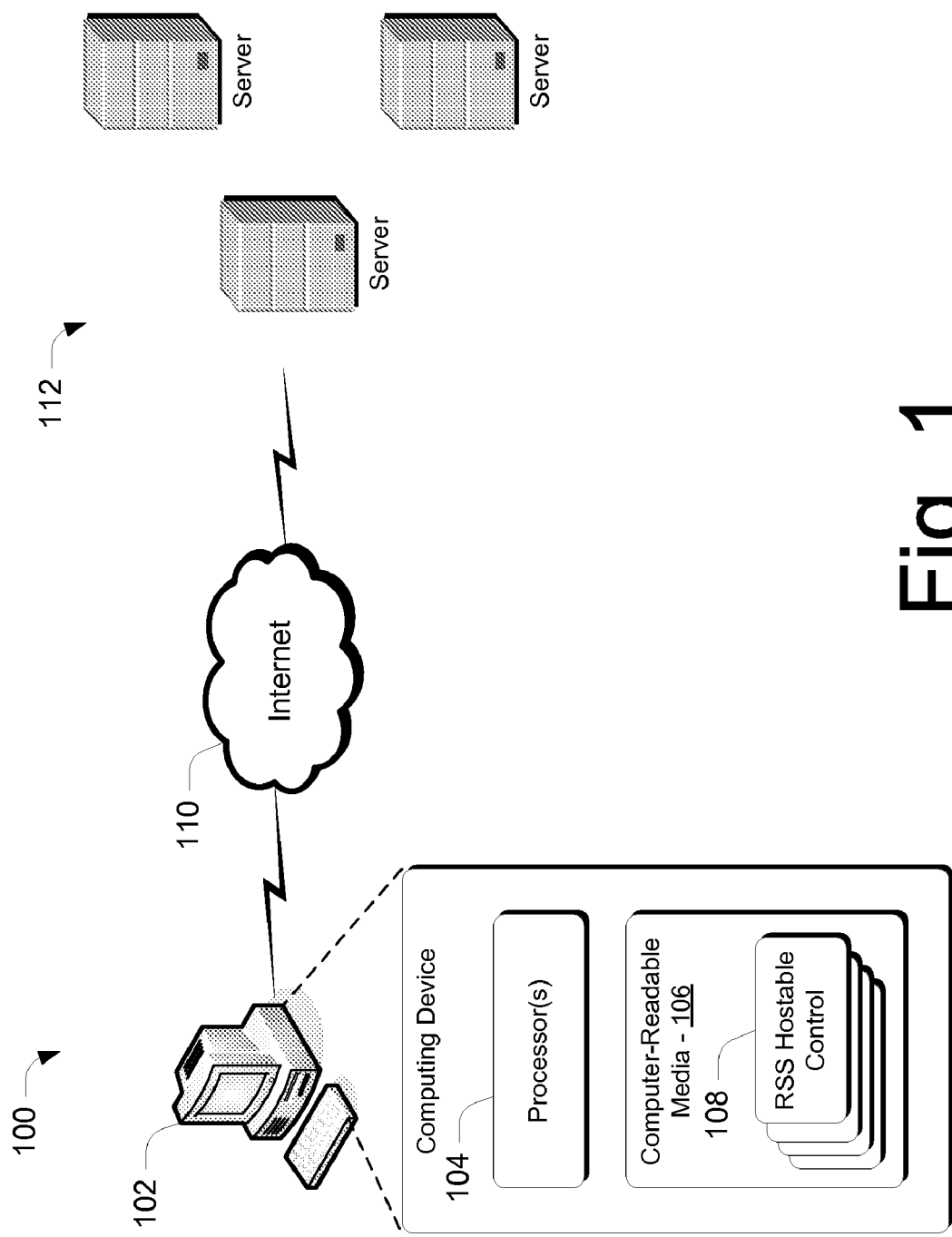
FIG. 1 illustrates a system in accordance with one embodiment.

FIG. 1 illustrates a system in accordance with one embodiment, generally at 100. In this example, system 100 includes a computing device 102 having one or more processors 104, one or more computer-readable media 106 and one or more RSS hostable controls 108 embodied on the computer-readable media in the form of computer-executable instructions.

Although computing device 102 is illustrated in the form of a desktop computer or client computer, it is to be appreciated and understood that other computing devices can be utilized without departing from the spirit and scope of the claimed subject matter. For example, other computing devices can include, by way of example and not limitation, portable computers, handheld computers such as personal digital assistants (PDAs), cell phones, servers and the like.

In addition, system 100 includes a network in the form of the Internet 110 through which computing device 102 communicates with one or more servers 112. The servers can be sources of RSS feeds that are received by computing device 102 and consumed by its user.

In at least some embodiments, hostable control 108 can be hosted by any suitable type of entity. For example, control 108 can be hosted by a web page or an application, such as a picture or photo application, database application, browser application and the like.

Figure 2:
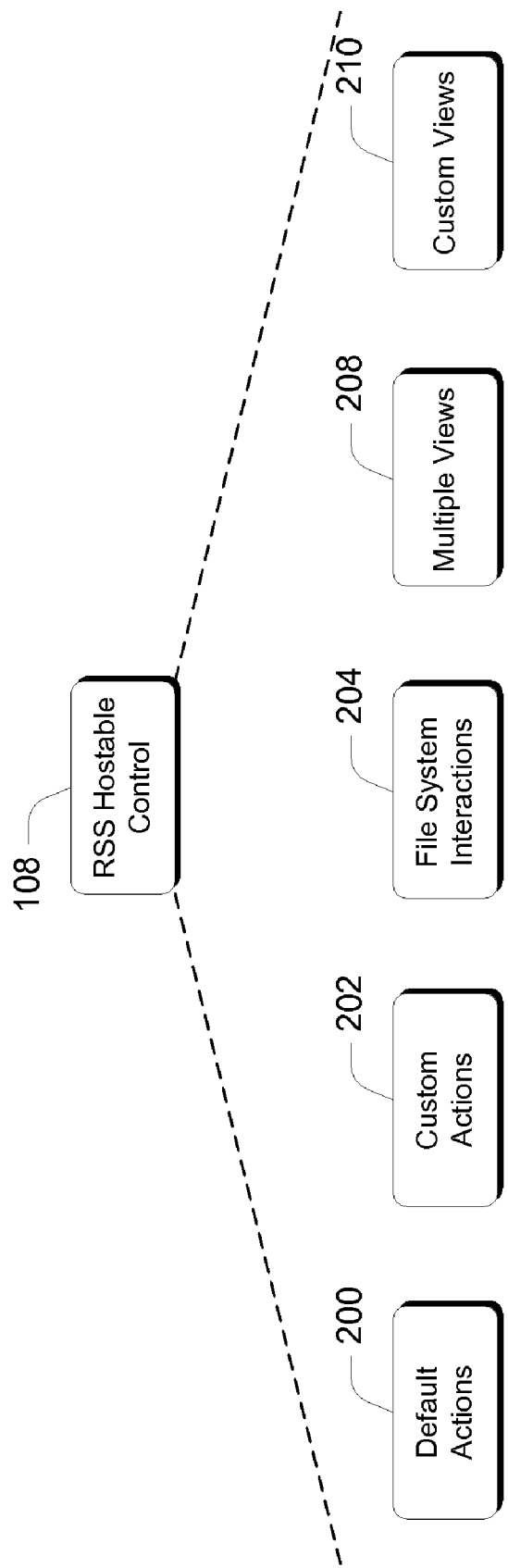
FIG. 2 illustrates an exemplary control along with individual features of the control in accordance with one embodiment.

FIG. 2 illustrates an exemplary control 108 along with individual features of the control in accordance with one embodiment. Here, hostable control 108 has features that include, by way of example and not limitation, default actions 200, custom actions 202, file system interactions 204, multiple views 208 and custom views 210.

Default actions 200 refers to those actions that are pre-programmed or pre-configured on the control and can include such things as open, save, copy and add to a collection, which are discussed in more detail below.

Custom actions 202 refer to those actions that can be programmed on the control by, for example, a developer. Custom actions can include any type of action such as delete, buy, rate this item and the like. As varied as the RSS items can be, so too can be the custom actions.

File system interactions 204 refer to those features that enable a user to take an RSS item from the web and interact with the file system in a seamless manner. This can include such actions as drag and drop functionality, exporting RSS items to a file and the like.

Multiple views 208 refer to the ability of the control to present RSS items in multiple different ways for the user.

Custom views 210 refer to the ability of the control to be programmed to display RSS content in a particular way. In the discussion below, this is done through a template.

These features are all discussed below in additional detail.

In the discussion that follows, two separate but related aspects of control 108 are described. First, characteristics of the control that enable a user to interact with RSS content are described under the heading "RSS Hostable Control Interaction". Encompassed in this section is a description of the control features that are used to provide default actions 200, custom actions 202 and file system interactions 204.

Following this, a section entitled "RSS Hostable Control Presentation" is provided and describes various ways in which the control can enable presentation of the content with which it interacts. Encompassed in this section is a description of the control features that are used to provide multiple views 208 and custom views 210.

RSS Hostable Control Interaction

When a web site or other source of RSS content expresses its content, because of the standardized nature of RSS, certain information pertaining to RSS items will be known. This information, as indicated above, is expressed in XML in a standard way, as will be appreciated by the skilled artisan. Hence, items that are very different in nature will still share at least some RSS attributes or properties, e.g. a title, description and/or link. This predictability can be leveraged by the inventive control to provide a standardized user experience when the user interacts with and consumes RSS data. Hence, regardless of what web site or source the user accesses, the user can interact with the items in the same way.

Figure 3:
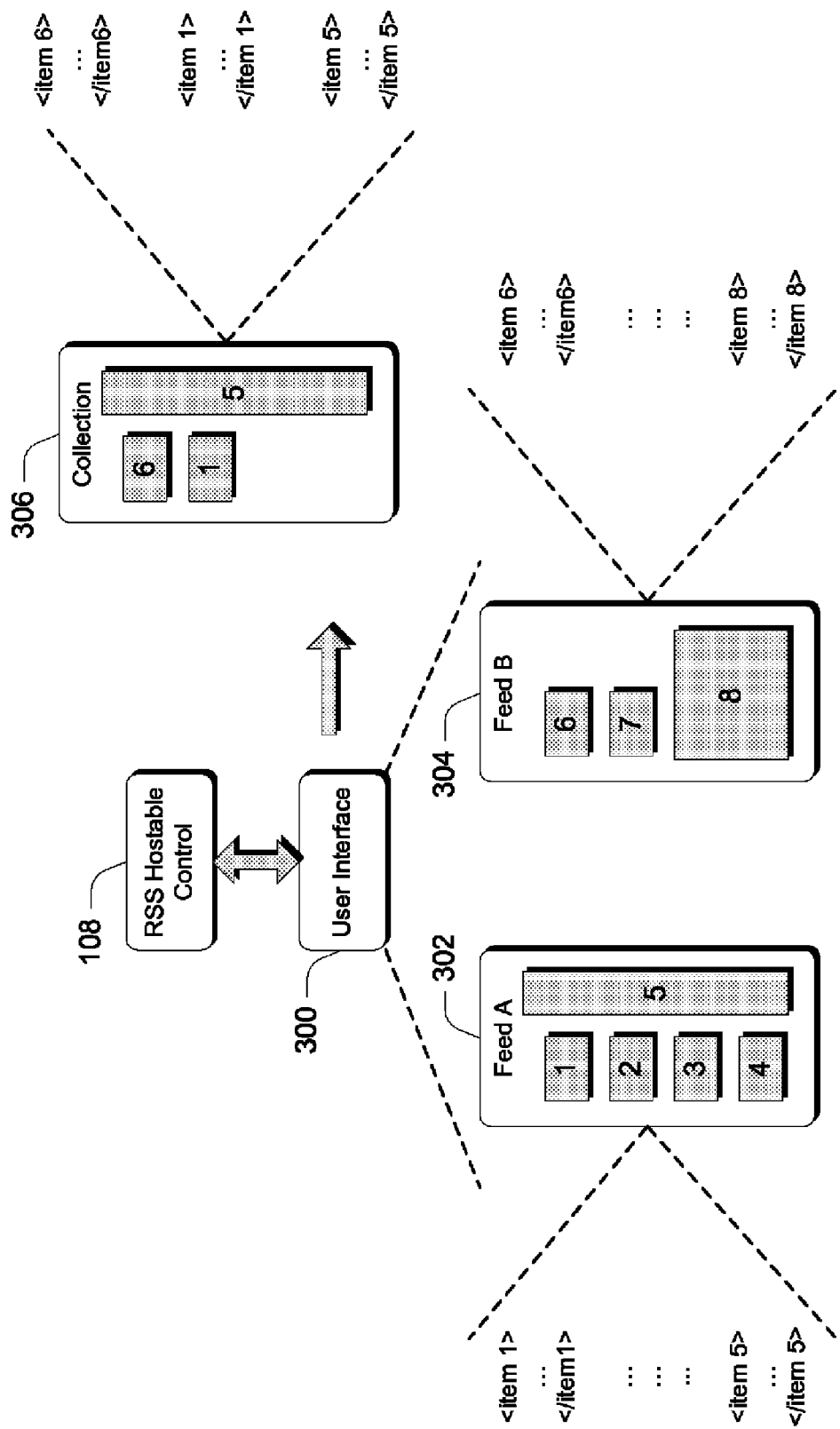
FIG. 3 diagrammatically illustrates a hostable control and one interaction that it supports in accordance with one embodiment.

As an example, consider FIG. 3 which diagrammatically illustrates hostable control 108 and one interaction that it supports. Here, hostable control 108 has a user interface component 300 that allows a user to interact with different RSS feeds. In practice, a hosting application or web site can provide the control with an URL associated with a feed. The control can then issue an HTTP Get request on the URL and receive, in response, an XML file that defines the RSS feed. The control can then render this feed for the user.

In this example, two such feeds are illustrated at 302, 304 respectively. Notice that each feed includes a number of items. For example, feed 302 includes items 1, 2, 3, 4 and 5. Likewise, feed 304 includes items 6, 7 and 8. Each RSS feed is described in XML as indicated above. Hence, feed 302 is described in XML which is shown just to its left. Likewise, feed 304 is described in XML which is shown just to its right. Notice that each individual item in each feed has its own tag-based XML description. Inside each item tag appear the properties and attributes associated with the individual item as mentioned above.

Consider now that when the user browses to a feed and selects to receive feed data, what they (or more accurately their software) receive is the XML that describes the feed. Using the XML, the software can further allow the user to consume the feed data by selecting individual feed items. Assume in this example that the user finds items 1 and 5 from feed 302 and item 6 from feed 304 interesting. Using the user interface 300, the user can select the individual items, as by dragging and dropping, or copying and pasting them into an appropriate container termed a collection, such as collection 306. In this particular example, collection 306 includes items 1 and 5 from feed 302 and item 6 from feed 304.

When a user opts to form a collection by selecting and copying items from different feeds, control 108 parses the XML associated with the individual feeds and selects the XML associated with the individual items selected by the user. Then, control 108 forms what can be considered as a combination of the XML from the different feeds to, in essence, provide a new user-defined feed. Accordingly, in the FIG. 3 example, notice that the XML just to the right of collection 306 includes XML associated with items 6, 1 and 5.

One way to access and acquire feed data can be to use a platform that is specially designed to interact with RSS feeds. One such platform is described in U.S. patent application Ser. No. 11/158,398. Of course, other methods and systems can be used without departing from the spirit and scope of the claimed subject matter.

Now, by virtue of having defined his or her feed that contains items from other feeds, the user can manipulate the collection data in any way supported by the control. This can include such things as reading and writing to the items.

Consider for a moment the functionality that this provides the user. Recall that feed items can constitute a broad and diverse group of different types of content. Within the RSS environment, however, this broad and diverse group of content shares at least some properties, defined by the XML of each item. This, in turn, can enable the control to bind to the feeds and provide the user with an integrated and unified consumption experience across different content types.

Consider also the various functionalities that can be provided once a collection, backed by XML, has been defined as described above. For example, operations or actions such as sorting and filtering can be conducted. Additionally, operations or actions that are specific to the content of the individual feeds can be conducted such as, for example, sorting by author, when such an element appears in the XML. Hence, functionalities or actions such as various default actions 200 (FIG. 2), custom actions 202 and file system interactions 204 can be supported to give the user a rich and robust number of ways to interact with the RSS content in their collection.

In the illustrated and described embodiment, a control can be backed by an RSS feed that is supported by a web site, or by a local store that resides, for example, on the user's computing device. For example, items can be copied from one control to another. The first control might be backed by an RSS feed that is supported by a web site. In at least some embodiments, the web site has the ability to update an item. For example, if the item is a document and the user is subscribed to the feed, the user can automatically receive updates to the document.

The second control (i.e. the one to which the item is copied) might be backed by a local store on the client computing device. Being backed by a local store can enable write access to content that is stored in the local store. This is somewhat different from the situation in which the control is backed by an RSS feed that is supported by a web site. Typically in those situations, as will be appreciated by the skilled artisan, there is no write access. In this situation, however, when the RSS content changes, those changes can be provided to the client computing device for updating.

FIG. 4 is a flow diagram that describes steps in a method in accordance with one embodiment. The method can be implemented in connection with any suitable hardware, software, firmware or combination thereof. In but one embodiment, the method can be implemented in software, such as that which resides on computer-readable media 106 (FIG. 1).

Step 400 provides one or more RSS hostable controls. This step can be accomplished by any number of suitable entities. For example, a control can be hosted by a web site or any suitable type of application examples of which are provided above. Step 402 assigns one or more actions to an RSS item. This step can be accomplished in any suitable way. For example, a suitably configured control can have a set of default actions that it supports. Such default actions can include, by way of example and not limitation, open, save and add to a collection. In addition, actions can include custom actions that are specific to a particular RSS item. These actions can be described in the XML that forms part of the RSS feed data from which the items come. Another type of action can pertain to file system interactions such as converting an RSS item to a file within a particular file system. More specifically, by virtue of knowing the type of data comprising the RSS item as well as its properties, a suitably configured control can either convert the item to a file or invoke the appropriate code to do the conversion. This can be done by mapping the appropriate properties for the RSS item into the appropriate file format. For example, if an item is an MPEG image, the control or suitably invoked code can convert the item into a file on the file system.

Step 404 creates a collection of RSS items from different feeds. This step can be accomplished in any suitable way examples of which are given above. In but one embodiment, a collection is formed by enabling a user, through a suitably configured user interface, to select individual RSS items from different feeds and establish a collection that contains those items.

Having discussed the various ways in which a user can interact with RSS items from different feeds, the discussion now turns to some different ways in which RSS items can be presented to the user via a user interface.

RSS Hostable Control Presentation

In one embodiment, if a web site does not express how a particular RSS item should be displayed, then the RSS hostable control can offer a number of different layout views.

In one embodiment, three different layout views are provided. A first of the layout views is simply what can be considered as a list view which serially lists the items of a feed or collection, similar to a file system's list view. In this example, each item would take up one line. A second of the layout views is an icon view in which individual icons are associated with each of the items and displayed for the user. In this example, the icons can contain some descriptive material. The icon view is similar to a file system's icon view. A third of the layout views is a detailed or full detail view in which an icon is provided along with various metadata associated with the individual items. The full detail view is similar to a file system's detail view in which a file name, type and date created or date modified is displayed.

In at least one embodiment, custom views can be created for individual items in the form of templates which reside in the XML that comprises part of the RSS feed. A template describes the layout of each of the items as well as the formatting. The custom views, if defined, are available for the user to switch amongst along with the default views. A template, if present, can override any of the default views but, as mentioned above, can be switched away from. In one embodiment, the template includes presentation data that is not layered in with the individual RSS items. As but one example of how this template can be defined, consider the example XML excerpt and related discussion just below.

Commonly, publishers provide an HTML description of the items in a feed so as to retain control over the presentation of their information, even while they provide the same data via item-extensions. This can result in several problems. First, each item has a copy of the presentation information (i.e. the HTML elements), even when, in many cases, the HTML is identical. Second, each item duplicates the meta-data between the description element and the metadata tags. Third, the HTML description is useful only when rendered by a browser of a particular form-factor.

In accordance with one embodiment, duplication of data can be reduced by using a templating mechanism. That is, different templates enable the client to select different renderings for the data depending on the form-factor or other needs. The example just below illustrates how a music site's Top 10 list could be modified to use HTML templates. This particular technique is chosen because it is easy for publishers to create, compared with other techniques that may require some coding ability.

The client of this format extension can be provided with a simple UI switch to allow the user to switch between a compact "summary" view and a more detailed "full" view, if the user is interested in additional data. In each case, the publisher is in complete control of the presentation of the content.

```
<rss>
    <channel>
        <title>MSN Music Top 10</title>
        <ext:item-template format="summary">
            <div xmlns="http://www.w3.org/1999/xhtml">
                <p><strong><% itms:artist %></strong></p>
                <p><% itms:title %></p>
                <p>Price: <% Itms:trackPrice %> </p>
            </div>
        </ext:item-template>
        <ext:item-template format="full">
            <div xmlns="http://www.w3.org/1999/xhtml">
                <p><strong><% itms:artist %></strong></p>
                <p><% itms:title %> ($<% itms:trackPrice %>) </p>
                <p>Album: <% itms:album %> ($ <% itms:albumPrice %>)</p>
                <p>Released: <% itms:ReleaseDate %> </p>
```

```
            </div>
        </ext:item-template>
    <item>
            <title>Hollaback Girl - Gwen Stefani</title>
            <link>http://example.com/id=121231</link>
            <pubDate>Thu, 05 May 2005 23:52:15 -800</pubDate>
            <description><![CDATA[ HTML blob ]]></description>
            <itms:artist>Gwen Stefani</itms:artist>
            <itms:album>Love, Angel, Music, Baby</itms:album>
            <itms:trackPrice>$0.99</itms:trackPrice>
            <itms:albumPrice>$9.99</itms:albumPrice>
                <itms:ReleaseDate>12/14/04</itms:ReleaseDate>
    </item>
    </channel>
</rss>
```

CONCLUSION

The embodiments described above utilize and leverage RSS to enable a user to interact more easily with different types of data, or data from different sources that are available over the web. In accordance with at least some embodiments, a hostable and/or customizable control is provided and gives the user the ability to interact with RSS feeds to store and further manipulate collections of items from different RSS feeds.

The inventive techniques described above can enable developers to quickly enable their items on a site so that the items can be interacted with by users. For example, users can easily save a photo on their desktop in the same way that a document is saved. Also, with the ability to save a collection of items and get updates if the item has changed, a user can, for example, have a book from Amazon.com and a movie from Netflix in the same collection and receive notifications if a particular item has changed.

Further, in at least some embodiments, a user can change the view of how the items are visualized.

Additionally, publishers can present their items in a richer way for branding or optimized data layout through, for example, the templates discussed above.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer-readable media embodying computer-executable instructions which, when executed, implement an RSS hostable control configured to:
provide a user with the ability to interact with RSS feeds to build a user-defined RSS feed that contains a number of items selected from different RSS feeds, the number of the selected items being capable of being less than a total number of items furnished by the different RSS feeds, wherein the user-defined RSS feed includes XML for each of the selected items and wherein the items comprise different types of content; and
wherein the hostable control is configured to:
enable write access to one or more of the selected RSS items; and
enable a user-selectable control associated with at least one custom action to be programmed on the hostable control, wherein the at least one custom action includes at least one XML-definable custom action that is described in an RSS feed from which an item is selected.

2. The one or more computer-readable media of claim 1, wherein the RSS hostable control can be hosted by a web page.

3. The one or more computer-readable media of claim 1, wherein the RSS hostable control can be hosted by an application.

4. The one or more computer-readable media of claim 3, wherein the application resides in the form of a browser.

5. The one or more computer-readable media of claim 1, wherein the hostable control supports a feature that comprises default actions.

6. The one or more computer-readable media of claim 1, wherein the hostable control supports features that comprise one or more of:
multiple views or custom views.

7. The one or more computer-readable media of claim 1, wherein the hostable control supports features comprising:
default actions, file system interactions, multiple views and custom views.

8. A computer-implemented method comprising:
enabling a user, via a user interface, to select a number of individual RSS items from different RSS feeds, the number of the selected RSS items being capable of being less than a total number of RSS items furnished by the different RSS feeds, wherein the enabling is performed, at least in part, utilizing an RSS hostable control that supports features comprising:
one or more user-selectable controls associated with at least one custom action programmed on the hostable control, wherein the at least one custom action includes an XML-definable custom action that is described in an RSS feed from which an item is selected; and
file system interactions that include enabling conversion of RSS items to a file within a particular file system;
establishing a user-defined feed comprising a collection that contains the selected RSS items;
wherein the act of establishing comprises parsing XML associated with said different RSS feeds and selecting XML that is associated with individual items selected by the user; and
enabling write access to one or more of the RSS items.

9. The method of claim 8, wherein the acts of enabling and establishing are performed, at least in part, by a browser.

10. The method of claim 8, wherein the RSS hostable control can bind to an RSS feed or a local store.

11. The method of claim 10, wherein the RSS hostable control can be hosted by a web site.

12. The method of claim 8, wherein the selected RSS items can comprise different types of items.

13. The method of claim 8 further comprising enabling the user to perform default actions.

14. The method of claim 8 further comprising enabling the user to view the items of a collection in one or more of: a list view, an icon view, a detail view, or a template view.

15. A computer-implemented method comprising:

provinding one or more RSS hostable controls, individual controls being configured to enable a user to select a number of different types of items from different RSS feeds and build a user-defined RSS feed from the selected items, the number of the selected different types of items being capable of being less than a total number of items furnished by the different RSS feeds, the user-defined RSS feed comprising XML from the different RSS feeds, the XML describing individual items of the user-defined RSS feed;

enabling write access to one or more of the items of the user-defined RSS feed; and assigning one or more actions to items of the user-defined RSS feed, wherein at least some actions are custom actions that are associated with at least one user-selectable control programmed on the one or more RSS hostable controls, and wherein at least some actions are described in XML that forms part of at least one RSS feed from which at least one item comes.

16. The method of claim 15, wherein the act of providing is performed by a browser.

* * * * *